United States Patent [19]

Allen

[11] Patent Number: 4,584,616

[45] Date of Patent: Apr. 22, 1986

[54] FORMAT FOR STORING DATA ON MAGNETIC MEDIA

[75] Inventor: David M. Allen, Overland Park, Kans.

[73] Assignee: Tallgrass Technologies Corporation, Overland Park, Kans.

[21] Appl. No.: 699,809

[22] Filed: Feb. 8, 1985

Related U.S. Application Data

[63] Continuation of Ser. No. 630,001, Jul. 12, 1984, abandoned.

[51] Int. Cl.$^4$ ............................................. G11B 5/09
[52] U.S. Cl. ...................................... 360/48; 360/49; 360/50
[58] Field of Search ................... 360/39, 40, 48, 49, 360/50

[56] References Cited

U.S. PATENT DOCUMENTS

| | | | |
|---|---|---|---|
| 3,399,394 | 8/1968 | Smith | 360/49 |
| 3,711,844 | 1/1973 | Irwin | 340/174.1 B |
| 4,081,844 | 3/1978 | Devore et al. | 360/48 |
| 4,310,861 | 1/1982 | Kashio | 360/50 |
| 4,345,280 | 8/1982 | Blagaile et al. | 340/49 |
| 4,366,512 | 12/1982 | Janak et al. | 360/48 |

FOREIGN PATENT DOCUMENTS 1372750 11/1974 United Kingdom .
1529583 10/1978 United Kingdom .

Primary Examiner—Vincent P. Canney
Attorney, Agent, or Firm—Kokjer, Kircher, Bradley, Wharton, Bowman & Johnson

[57] ABSTRACT

Digitally encoded information is stored on a data track in an improved format characterized by a leader field followed by a data field and a trash gap at the end of the data field. On a rotatable disk storage medium, the leader field has a randomly selected starting point which may change each time a new set of data is recorded on the track. The leader field contains encoded control information which signals the beginning of the ensuring data field. The trash gap may contain spurious data remaining from a previously recorded set of data and is maintained shorter than the leader field at all permissible rotational speeds of the disk to prevent spurious data on the trash gap from being erroneously recognized as valid leader field control information.

11 Claims, 3 Drawing Figures

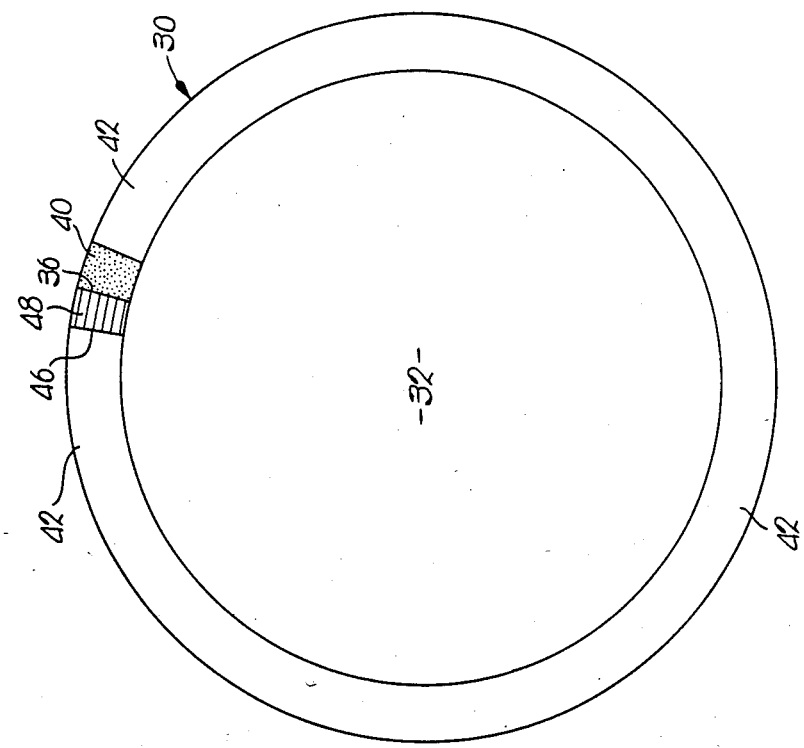
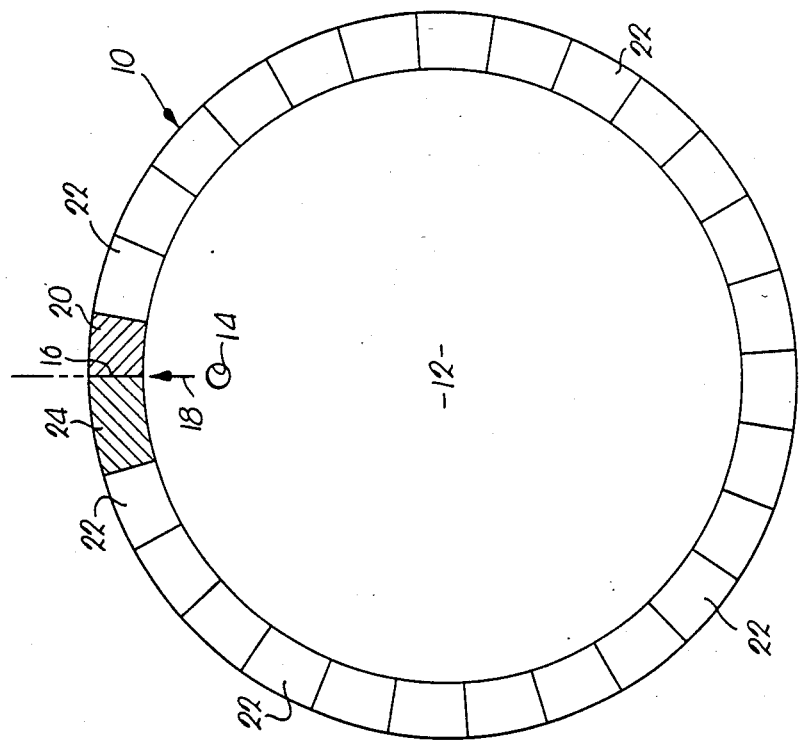
Fig. 1. PRIOR ART
Fig. 2.

FORMAT FOR STORING DATA ON MAGNETIC MEDIA

This is a continuation of application Ser. No. 630,001, filed 7-12-84 now abandoned.

BACKGROUND OF THE INVENTION

1. Field of the Invention

This invention relates to the field of storing and retrieving magnetically recorded, appropriately reencoded, physical representations of digitally encoded, logical information on and from moving storage media such as magnetic disks and tapes. More particularly, the invention provides an improved arrangement for the incorporation of the required control and data information into such magnetic representations and improved method techniques and apparatus for implementing the practical application thereof to both disk and tape type media in respect of both writing to and reading from the latter. Still more specifically, the invention provides a uniform and more efficient format for the recording and sensing of magnetic representations of control and data information while using either disk or tape type media, together with method techniques and interfacing, controller apparatus that are employable in identical manner and form for either disk or tape type media. Other advantages of the invention are further described in the appropriate subsequent sections hereof.

2. Description of the Prior Art

The relationship of this invention to the state of the known prior art can be understood in proper perspective only in the context of recognition of the three facets of the invention that cooperate to achieve optimized realization of the advantages it makes possible—namely, the improved arrangement or "formatting" of the physical representation that is magnetically recorded upon a storage medium to provide an efficient and reliably retrievable record embodying both given data and needed control information, the improved combination of information handling and magnetic storage and retrieval steps to provide a method for practical application of the improved arrangement or "formatting", and the improved combination of structural elements to provide practical apparatus for implementing the improved method.

In general, the improved arrangement for the physical representation of information magnetically recorded upon a disk medium is believed to be basically novel and to depart from prior practices in a manner diametrically contrary to long established and universally employed, present formatting conventions. The combinational aspect of the improved method is believed to also be both new and a previously uncharted excursion from accepted prior information storage and retrieval methodology, although the improved method does employ in combination a number of individual steps or techniques which of themselves are each either old or well within the skill of the art when considered in isolation (as to which per se, and apart from the combinational aspect of the improved method provided by this invention, no claim is herein made). Similarly, the combinational aspect of the improved apparatus is believed to represent a significant and novel departure from both prior constructions and prevailing conceptual approaches to implementation of hardware for the interfacing of a computer with moving media type, peripheral, magnetic storage units, although the improved apparatus does employ in combination a number of individual elements or modules which of themselves are each either old or well within the skill of the art when considered in isolation (as to which per se, and apart from the combinational aspect of the improved apparatus provided by this invention, no claim is herein made).

To further illustrate the relationship of the invention to the background state of the art, and with reference first to the apparatus aspect of the matter, it is clear that the computer and the magnetic disk (and optionally also magnetic tape) units, including their internal drive assemblies, magnetic, read/write heads, etc., involved in the overall, systemic combination to which the invention is applicable may not only each be of conventional character, but may be of various specific, known constructions, which is, of course, a desirable attribute of the invention permitting its immediate application in existing data processing systems merely by incorporation therein of the improved form of peripheral magnetic storage controller assemblies contemplated by the invention. Likewise, conventional types of magnetic disk and tape media can be employed in implementing the invention on an immediate basis. Since another advantage of the invention is that it requires no provision for "hard indexing" of disks, however, it will be apparent that the hard indexing means included in conventional disk media and the hard index detecting means included in conventional disk drive units are not utilized in the practice of this invention and may be omitted from disk media and drive units produced in the future, with consequent reduction of production costs and enhanced reliability through simplification. With respect to the improved controller assemblies provided by the invention, the individual, electronic, functional modules employed therein (i.e., a buffer, a write data selector, a 4-bit code to 5-bit code encoder, a complementer or multi-bit inverter, a parallel to serial converter, a write clock, a write counter, a serial to parallel converter, another complementer, a 5bit code to 4-bit code decoder, a read data latch, a synchronizing signal controlled read clock, a read counter, an EXCLUSIVE OR data start signal detector, a 1-bit latches, etc.) are each either conventional from the standpoint of the internal components and circuitry involved in the individual functional module or of nature to be readily constructed according to the desired operating parameters by those skilled in the art with conventional components and, in most instances, in a variety of alternative fashions available as a matter of choice, merely from the functional descriptions of such modules hereinafter contained (if not, indeed, merely from their descriptive names and functional relationships to the other modules). Such amenability of the invention to implementation of the improved apparatus it contemplates by appropriately combining conventional types of individual, electronic, functional modules is thought to be another of its advantages.

Similarly, with reference to the method aspects of the invention, from the standpoint of the individual steps involved, the improved method advantageously largely employs known and well understood techniques. For example, the operations of writing a physical representation of electrical signal levels corresponding to the binary value of "bits" of encoded information onto a moving, magnetic storage medium by correspondingly setting the magnetic state of successive small zones along an elongate recording track of the medium through appropriately controlling the momentary energization of a gapped, electromagnetic "write head" adjacent the track and of subsequently sensing the magnetic states of a succession of such zones to produce an electrical output signal of level varying in response to transitions between the states of such successive zones moving into juxtaposition with a gapped, electromagnetic "read head", are quite conventional. Likewise, various techniques for expressing information in digitally encoded form (such as in ASCII or ISO interchange code or another binary type code internally useable within a computer), for further encoding such computer compatible, encoded information into a special recording code for use in recording the same upon a magnetic storage medium (such as in the recording codes known as "FM", "MFM", "GCR", etc.), for decoding transitions of magnetic state between successive zones of a track of a recording medium serially sensed during reading from the medium into electrical signals encoded in the recording code being employed, and for then further converting from electrical signals encoded in the recording code to electrical signals encoded in the internally recognizable computer code, are all individually well known and widely practiced. Other individually known techniques utilized in certain steps of the improved method include temporarily storing encoded information representations in a buffer memory, controlling the storage of such information representations into the buffer memory or the accessing thereof from the buffer memory in increments of groups of electrical signals representing a preselected number of bits of encoded information in "parallel", converting information representations encoded in one such parallel code into another parallel code (such as from internal code or segments thereof into recording code, or visa versa), converting encoded information representations from a parallel encoding involving a plurality of electrical signals into a series of successive electrical signals whose levels have binary significance and visa versa, timing or "clocking" the recording of information represented as magnetic flux states of successive zones along a track of a magnetic storage medium, deriving an electrical signal pulsed at regular intervals from control information "embedded" in the magnetically recorded version of data information encoded in a "self-clocking" type recording code for use as a synchronizing control signal during reading from a magnetic storage medium, counting the number of binary bit value representations or predetermined groups thereof being written onto or read from a magnetic storage medium, etc.

As previously indicated, therefore, it should be understood that this invention is primarily concerned with overcoming certain very significant limitations and disadvantages of prior approaches to the interfacing of a computer with peripheral magnetic storage units, especially those of the disk type, and that the invention provides a solution to the problems inherent in prevailing interfacing practices through first adopting a radically different arrangement or format for the ultimate, overall, physical representation of information to be transferred from a computer onto the recording medium of a peripheral disk (or tape) storage unit or visa versa, and then conveniently provides for the implementation of such new arrangement or format through the employment of an overall method and overall interfacing apparatus which can be both easily understood and readily placed into practice by those skilled in the art, by virtue of such method and apparatus being predicated upon merely combining in a new way individual method steps and individual electrical modules that are of themselves each familiar and immediately available to those skilled in the art.

At least some of the primary limitations and disadvantages of prior and current practices with respect to the interfacing with computers of peripheral magnetic disk storage units may be summarily noted as further background for appreciation of both the accomplishments of this invention and the marked extent to which the various facets thereof depart from what has heretofore become universally accepted, conventional practice.

Prior disk type, magnetic storage media have employed what is referred to as "hard indexing", typically implemented through the provision of one or more holes, protuberances or the like on the physical rotating medium itself, which can be optically or otherwise sensed when passing by a fixed point within the associated drive unit during rotation of the disk. Another approach to hard indexing has been to magnetically record upon a special track of a disk being initialized for use one or more magnetically represented index "marks" that could be magnetically sensed during rotation of the disk. With either of such hard indexing implementations, however, it has been customary in fulfilling the very purpose of such hard indexes to commence magnetically recording information upon the disk only at a fixed point of the track to be recorded corresponding to the detection of the hard index of the disk or at a subsequent point thereon separated from the hard index by some predetermined time interval of rotation of the disk and a corresponding stretch of the recording track frequently referred to as a "gap" (in which some pattern of flux transitions having control signficance at least for identifying the stretch as a particular gap, but none of the actual data information to be stored, will typically be recorded). Thus, every information writing operation upon conventional disk media involves a statistically inherent average latency interval before the recording of information can commence, since the rotation of the disk into a position bringing the hard index to the point for detection thereof must be awaited.

Prior and current practice has also been to record information upon disk type media, after an initial, common, "post index" gap, in a significant number of so-called "sectors" along each recording track, which are separated from each other by additional gaps contained in each sector and also not containing a physical representation of any of the data information to be stored and retrieved, the latter being limited to representation within the part reserved for data of one or the other of the separate sectors contained in the track. This now "inbred" practice of conventional disk storage methodology and apparatus has apparently survived as a historic remnant of the very early days of magnetic disk storage technology in which it was common for some part of a recording track upon a disk medium to be defective, so that "sectoring" was adopted to facilitate the recording of information upon those parts of a particular disk track that were not defective, while skipping those that were defective. Such long standing practice of sectoring of information recorded upon the track of a disk medium has, however, not only for some time been unnecessary in view of the improved quality of disk media resulting from technological advances in the manufacture of such media, but represents a significant waste of the usable length of recording space available in each track of a disk for the storage of useful data information, as well as tending to complicate problems of providing satisfactory synchronization during reading from the disk. Certain typical, sectored arrangements for the physical representation of information on the track of a disk type storage medium will hereinafter be considered in greater detail in comparison with the improved arrangement provided by this invention, but it may be noted that the difference of storage efficiency is significant, with a typical sectored arrangement utilizing less than 65% of the length of each track for the storage of actual data information, as compared with the improved arrangement provided by this invention in which useful data information may occupy in excess of 95% of the length of each track.

A side effect of the prior adherence to a sectored format for information recorded upon disk type media, which is apparently based upon implied recognition of the inefficiency of the latter, is that an entirely different formatting arrangement has been employed for storage upon tape type media, wherein the constraints of track length inherent in disk type media are not applicable. The current de facto acceptance of the assumed necessity for arranging or formatting the physical representation of magnetically recorded information differently for disk and tape types of media has heretofore also brought about an assumed necessity for employing separate and differing methods and controller assemblies for the storage and retrieval of information upon disk and tape types of media respectively.

SUMMARY OF THE INVENTION

The keystone of this invention involves the recognition and practical implementation of the discovery that the previously mentioned and other limitations and disadvantages of current magnetic information storage practices can be eliminated and other advantages enjoyed by adopting an improved arrangement or format for the physical representation of information to be recorded, wherein the same arrangement is used for both disk and tape types of media, and the specific parameters for the preferred arrangement to be employed in any computer system are determined from certain characteristics of the type of disk media to be employed in the system and certain characteristics of the drive units with which such disk media will be associated during use in the system. The improved arrangement provided by this invention broadly involves a format in which each track of the disk media to be employed is treated as an unsectored, continuous and elongate space of finite length for the recording of information by appropriately setting the states of magnetization of successive zones along such track, with such arrangement including merely a single lead portion or "field" containing control significant information (for use in establishing initial synchronization and marking the start of data during reading) followed by a single body portion (or "data field) containing data significant information (together with some embedded control information for use for continuing synchronization purposes during data reading, which is inherent in the recording code to be employed). Such improved arrangement permits the overwhelmingly major portion of the length of each track to be utilized for the storage and retrieval of useful data information and also significantly permits the recording of each track to commence at any point along the latter without any necessity either for hard indexing structures in the disk medium itself or for corresponding sensing structure in the drive units in which the medium will be utilized.

The parameters for the relative and absolute lengths of the lead portion and the body portion of the improved arrangement or format for recorded information are conveniently derived for any type of disk medium and its associated drive unit by initially determining the length or storage capacity of a single track of such medium when rotated at the normal speed of the associated drive unit (in terms of the number of zones along the track that are to be distinguishable as being in discrete magnetic states with the recording density to be employed, the number of logic information bit representations to be magnetically recorded along the track, the number of bytes of magnetically represented information to be recorded along the track or the like), as a range extending between a maximum value and a minimum value imposed by the allowable extent of the variation in the speed at which the drive unit will rotate the disk medium over the operational conditions to be expected and tolerated, and then selecting lengths for the lead portion and the body portion respectively of the format to be recorded upon each track such that the combined lengths of the lead and body portions is not exceeded by the total length of the track by an amount as great as the length of the lead portion within the range of variation of disk speed to be permitted as conforming to normally tolerable operating conditions. Merely as an example, a lead portion having a length of, say 256 bytes of recorded control information is quite satisfactory for use with a typical "double density" recorded body portion of 10,000 bytes in length for a track of a typical "floppy" disk medium having a total nominal length of about 10,364 of such bytes, and is more than adequate for "single density" recording in which a lead portion of 256 bytes would leave about 4,900 bytes for the data significant body portion upon a track having a total length at nominal operating speed for the associated drive unit of about 5,200 bytes, in both cases assuming a variation in drive unit speed and corresponding effective track length of not more than plus or minus 1%. The minimum length for the lead portion is thus set by the mentioned criteria for selection thereof, so that any recorded information remaining on the track from a previous usage thereof could not be of length as great as the predetermined minimum length of the lead portion and thereby trigger an invalid reading of obsolete data remaining on the track from a previous use thereof (the length of the lead portion being counted by the method of this invention during a reading operation to assure that the reading of data information cannot commence until the actual body portion of the recording upon the track is reached).

The same improved arrangement or format is then also employed in recording information upon any tape type media employed in the same system, and the comparatively great length of the body portion of such format as compared with the lead portion thereof, as well as the relatively large absolute length of the body portion, are such that the improved format has also been found to be quite efficient with tape media.

As would be expected, the uniqueness of the improved arrangement or format for information to be stored in the form of a magnetic representation thereof necessitates for the implementation thereof the provision of an improved method and improved apparatus adapted for such purpose. Although the combination of steps involved in the methodology and the combination of primarily electronic modules involved in the apparatus are quite different in their overall aspects from what has been utilized or would have been appropriate to utilize in the past, both the improved methodology and hardware implementation of the invention conveniently employ steps and functional modules that are individually each already known and available, so that those skilled in the art may proceed with implementation of this invention employing merely techniques and component subassemblies with which they are already individually familiar and which may be directly combined for the purposes of this invention in accordance with the disclosure herein provided in that regard.

As an example of secondary, but significant, further improvements in interfacing technology also provided by the invention are the manner in which encoding and decoding between 4-bit and 5-bit code groups is accomplished in implementation simplifying fashion through the use of complementers in conjunction with the usual encoder/decoder ROM modules.

BRIEF DESCRIPTION OF THE DRAWINGS

FIG. 1 is a schematic representation, not to scale, depicting a typical arrangement in which information is conventionally recorded upon a track of a magnetic storage disk, and the presence of a "hard index" structure on such disk, in accordance with prior art practices;

FIG. 2 is a schematic representation, not to scale, depicting the improved arrangement in which information is recorded upon a track of a magnetic storage disk, and the absence of any "hard index" structure on such disk, in accordance with this invention.

DESCRIPTION OF THE PREFERRED EMBODIMENT

General Background

Figure 3:
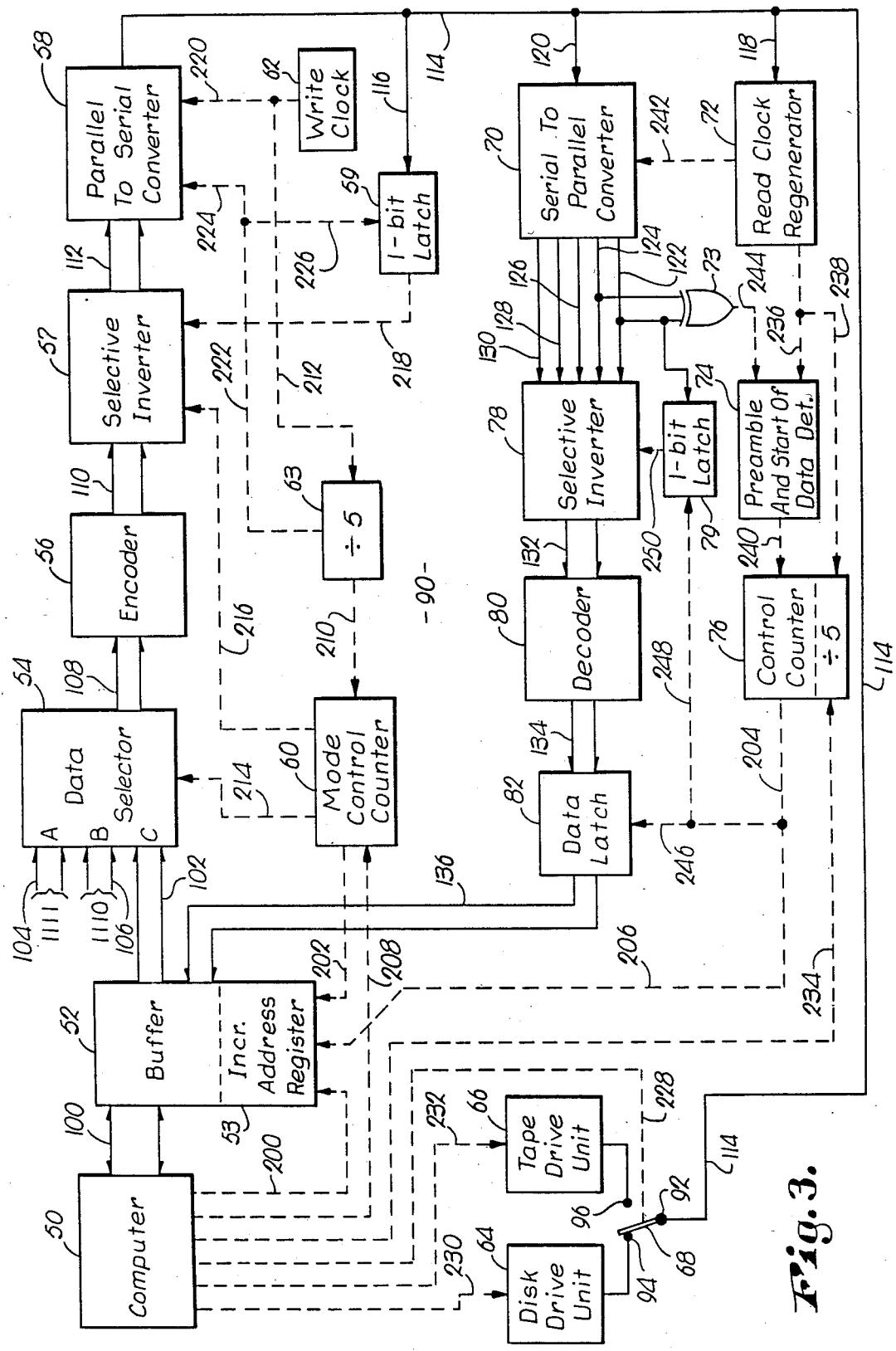
FIG. 3 is a block diagram illustrating the principal, functional module, combinational elements of the improved, preferred embodiment of apparatus for implementing this invention, as well as the primary, electrical signal and control paths between such elements by which they are correlated into an overall system for achieving the results made possible by the invention.

Some background review of the various encodings and physical representations of logical information employed in typical computer systems should be helpful as a prelude to consideration of the improved arrangement or format for physically representing magnetically stored information on disk or other recording media provided by this invention, as well as the related method and apparatus improvements also provided by the latter.

In communication between a computer and a human user oriented device, such as an input terminal or an output printer, logical information is normally expressed as a series of alphanumeric characters for conveying text or numeric type information, along with certain special characters having logical significance as punctuation or the like. Such alphanumeric information is typically carried between the computer and peripheral devices such as an input terminal or a printer in the form of a series of electrical pulses or changes in electrical signal level, which are encoded in groups each representing a distinguishable alphanumeric character. There are various such socalled "interchange codes" that have been used, the ones in most common use today being the ones known as the ASCII and ISO codes, which involve a series of seven or eight successive periods of signal levels of one or the other of a pair of levels respectively representing a binary "bit" value of either "0" or "1", that are informationally significant, and which may be preceded or followed by additional control or/and filler pulses associated with the thus encoded electrical representation of each character. Such interchange coded representations of alphanumeric logical information are normally converted upon arriving at the computer from their serial form involving successive signal levels upon a single electrical lead line into parallel form in which each typically eight-bit group, commonly called a "byte", will be represented within the computer as binary valued electrical signal levels respectively carried upon eight separate, electrically conductive paths or leads constituting an internal bus (or as a part of a bus including a greater number of separate leads for simultaneously carrying in parallel more than one byte of thus encoded information). The opposite type of conversion from parallel to serial form occurs for information leaving the computer for transfer to a serial type peripheral device.

Within the computer itself, such interchange coded representations of alphanumeric information may be directly utilized as one form of "internal code", but certain types of data are typically subjected to conversion into electrical signals or levels thereof according to another binary-valued code, also constituting an "internal" code, which can be more efficiently utilized for the processing of certain types of logical information, especially that representing numeric values (which are commonly expressed and acted upon within the computer in 2's complement binary coded form involving some predetermined number of bytes, depending upon the specific nature of the computer itself).

When such parallel encoded, internal code type information is to be transferred in either direction between the computer and a peripheral magnetic storage device, such transfer is normally handled via a subsystem commonly called a "controller". It is the function of the controller subsystem to effectuate such further encodings and decodings as may be appropriate for writing the information or reading the information from the magnetic storage, peripheral devices employed in the overall system, which with movable type, magnetic disk or tape devices typically requires conversion of parallel encoded internal representations to or from an appropriate serial coded representation including both an informational content representing the data to be stored or retrieved and such control information as may be required for proper operation of the peripheral storage unit in cooperation with the controller subsystem through which it communicates with the computer. Although not inherently essential and not a limitation of this invention, it is typical for controller subsystems to handle information that may be processed within the computer itself in parallel byte or multi-byte form by breaking the same down into small units each representing four logical informational bits and often called "nybbles".

The gapped type electromagnetic components employed in disk and tape units for magnetically storing or sensing information recorded upon disk or tape types of media are designed to most reliably operate, both during the writing of information to the media and during reading of previously recorded information from the latter, by way of producing or responding to transitions in the polarity of the state of magnetization of minute zones disposed successively along the length of a recording track of the magnetic medium being employed. That consideration, in turn, has led to the adoption of further encodings for optimumly providing or detecting a series of transitions of electrical signal level adapted to produce or be detectible as representing a corresponding series of transitions of state of magnetic polarization of zones along the track of the recording medium. The latter type of recording encodings are commonly referred to as "run length limited codes ('RLLC')", a typical example being a 4:5 fixed length, single track, "group code recording ('GCR')" code characterized by producing groups of five successive, binary valued, signal levels for recording an appropriate state of magnetization upon five successive zones of the recording track for each four bit nybble of information to be recorded, and visa versa during reading from the magnetic storage medium.

Whatever the precise nature of the recording code utilized for recording a succession of magnetic states of polarization onto successive zones of a recording track, so as to provide reliably detectable transitions between the magnetic states of selected adjacent pairs of such zones, the relative movement between the write head component of the drive unit and the moving medium itself require that the recording operation be "clocked", that is, the longitudinal extent of each zone intended to represent an informationally significant aspect of the recorded representation can most easily be regulated by delineating the extent of such zones according to the successive occurrences at regular intervals of time so-called "clocking pulses". Similarly, the proper retrieval of information represented upon the storage medium in the form of the magnetic state of polarization of successive zones along the recording track of such medium must be read in the context of some time or event oriented frame of reference represented by some form of clocking signal desirably in the form of pulses or transitions of electrical signal level. The clocking signals utilized during recording manifestly must correlate with those utilized during retrieval if reliability in the latter operation is to be achieved. This entire matter is complicated, however, by the fact that the peripheral drive units employed with magnetic storage media inherently are incapable of maintaining an absolutely constant speed of relative movement between the media handled thereby and the read and write heads employed therein, although the variation in such speed of currently produced peripheral, moving magnetic media units is commonly maintained to a relatively close tolerance of plus or minus 1% or less of the nominal speed of movement of the media for which the unit was designed, and any variation outside of such design tolerance range would be considered as abnormal and as representing an equipment fault outside of normal operating parameters.

Early recording codes, such as "RZ", "NRZ" and "NRZI", dealt with the "clocking problem" by utilizing a second track of the recording medium for the purpose of recording upon the latter, simultaneously with the recording of the representation of information to be stored upon the data recording track, a series of alternating states of magnetic polarization coinciding in time with the recording of each informationally significant zone of the data representing track, so that the clocking track could provide a correlated series of clocking pulses to be used during the subsequent reading of recorded data information for identifying the extent of the informationally significant zones (or transition points therebetween) of the latter. This, however, resulted in obvious wastage of the magnetic storage area available on any given medium, by virtue of the extra track or tracks required for recording clocking information along with the data information to be stored. Accordingly, so-called "self-clocking" recording codes were developed, of which those that are best known and in most common current usage are "FM", "MFM" and "GCR". The one currently preferred for use in practicing this invention is a form of 4:5 fixed length, single track "GCR". Such self-clocking codes have the attribute that the transitions of magnetic state polarization between pairs of adjacent zones along the information recording track occur with sufficient frequency and regularity that they provide during reading from the medium an "embedded" source of clocking information that can be reliably utilized to maintain a so-called "read clock" forming a part of the controller subsystem in synchronization with the encoded information being read from a single track of the medium, without any necessity for recording or separately reading clocking information from a separate clocking track of the medium.

Although this invention may be adapted to employ various recording codes, particularly those of the self-clocking type, the GCR type, 5-bit recording code currently preferred for implementing the invention in an especially straightforward and reliable manner through the employment of known and tested electronic circuitry techniques at the individual modular level is characterized by representing each bit thereof as a flux state of magnetic polarization of the corresponding one of the zones disposed successively along a recording track of the magnetic storage medium. Thus, a "0" bit may be represented by a "North" flux state and a "1" bit by a "South" flux state. More significantly, however, a "0" bit followed by a "1" bit, or vice versa, provides a reversal of flux polarity at the boundary between the adjacent zones of the track representing such bits, while successive bits (either "0's" or "1's") are represented by adjacent zones of the same magnetic polarization presenting no flux reversal at their common boundary. It is the occurrence or absence of such a flux reversal, not the "direction" thereof, that is informationally and physically significant in such a recording code.

Another constraint of GCR type encoding is that a flux reversal shall occur no less frequently than every third boundary between successive zones in any succession of 5-bit groups, or, to state it another way, that no more than three successive bits in any code group or succession of such groups will have the same binary value. Such constraint assures that, during reading from a track of a magnetic storage medium, reliably detectible flux reversals (transitions from one state of polarization to another between adjacent zones of the track) will occur at close enough intervals of time to provide an efficient control signal for assuring maintenance of accurate synchronization of a "read clock" oscillator in the associated controller whose output is utilized to mark the beginning of the magnetically recorded representation of each GCR type encoded 5-bit information group. As compared with FM recording code, for example, such encoding permits the density of the data recorded along a track of a magnetic storage medium to be effectively doubled.

As those skilled in the art will be aware or readily appreciate, the reason GCR type encoding employs five bits for representing each nybble or 4-bit group of information bits is that, if the latter were directly converted into a recording code also employing groups of only four bits each, it would be impossible to represent all 16 possible permutations of the 4-bit information group without the above-mentioned constraint for providing self-clocking control information from the recording code being violated. Consideration of the available permutations of the binary values of the bits in a 5-bit group will confirm, however, that, out of the 32 permutations that are possible, 17 represent "legal codes" satisfying the mentioned constraint for providing self-clocking. Of the 17 legal codes thus available from each 5-bit group, the preferred form of GCR employs 16 of same to represent the 16 possible permutations of the four bits of a nybble of data information to be recorded or retrieved (the mapping selected not being material to this invention) and employs the 17th or remaining legal code, along with one of the data codes, for use in establishing initial synchronization of the read clock of the controller prior to the read head of the disk or tape unit encountering the data representing portion of the recording track and, in this invention, for a second important purpose hereinafter discussed. One of the data codes is also used for the start of data marker, when it appears directly following the required sequence of synchronizing code groups, as will be further discussed hereinafter.

Since it will be most convenient or meaningful when referring to quantities of information or the physical characteristics thereof in various contexts germane to the invention or its background to sometimes refer to the same in terms of individual, binary valued "bits", at other times in terms of 4-bit groups frequently called "nybbles", and at other times in terms of 8-bit groups called "bytes", it may be helpful to summarize at this point the general correspondence or conversion relationships between physical representations of encoded information expressed in the mentioned different terms of "measurement" thereof. As previously mentioned, alphanumeric or binary numeric data is typically encoded into 8-bit bytes of internal code as the basic unit for the storage, processing and transferring of information within the computer itself (or in units comprising some predetermined plurality of bytes usually referred to as "words"), with each bit of such bytes represented by one of a pair of alternate electrical signal levels during transfers (in which the bits may be transferred serially over a single electrical lead or in parallel over a corresponding plural of leads) or as one of a pair of alternate states of a "flip-flop" or the like during storage and processing within the computer itself. Such internally coded 8-bit bytes may actually utilize all eight bits thereof or some lesser number, such as seven, as being significant for information representing purposes, although all eight bits of each such byte are normally transferred between the computer and a controller associated therewith for controlling a peripheral device such as a magnetic storage, disk or tape drive unit. In the field of storage and retrieval of information from magnetic disk media, the controller may break down each such byte of internally coded information representations into two halves of four bits each called "nybbles", with the four bits of the first half of a byte being handled first, followed by handling of the second half or nybble of each byte. For the reasons previously noted, however, in recording or retrieving information represented on a magnetic disc medium in the form of flux reversals between adjacently successive zones along a recording track, it is necessary in order to provide "self-clocking" that the controller perform a conversion (further encoding or decoding) of each of the nybbles coming from or going onto the medium into groups of binary valued bits including an "extra" bit to provide the necessary number of "legal recording codes" for transfer to or from the disk medium. Thus, with the GCR type recording code and other self-clocking recording codes that deal with information representations in units of nybbles, the controller performs the necessary conversion between 4-bit nybbles or half-bytes of internal code and the 5-bit groups to be utilized in transfers to and from the disk medium. The GCR type recording code preferred for implementation of this invention utilizes as significant only flux reversals or the absence thereof occurring in synchronization with the pulses of the clocking signal or, in another sense, at the boundary between the successive, substantially, uniformly dimensioned zones along the recording track of the magnetic medium, which may be regarded as "cells" whose specific individual states of magnetic polarization are treated as secondary. It might appear, therefore, that GCR type coded magnetic representations of information upon a magnetic storage medium, being dependent upon the presence or absence of a flux reversal (in either direction of magnetic polarity) at the boundary between successive zones or cells along the recording track would seem to require a succession of six such zones or cells in order to represent the presence or absence of flux reversals at five boundaries corresponding to the five bits of each GCR type recording code group. In one, somewhat illusory sense, such is obviously the case; however, those skilled in the art will understood that, when a succession of 5-bit GCR type code groups are being handled, that is, either being recorded upon a recording track of a magnetic storage medium or sensed therefrom, the presence or absence of a flux reversal in the boundary between the 5th or last cell of each group and the first cell of the next following group provides the 5th significant reversal condition representation required for each 5-bit GCR type code group, with the overall result that information represented as a series of successive GCR type code groups will essentially require only five cells along the storage track for the representation of each such 5-bit code group. Therefore, it will be further understood that each nybble of information expressed in the internal code of the computer is represented as five successive cells along the recording track of the magnetic storage medium, and that each byte of information expressed in the internal code of the computer is magnetically represented on the storage medium by the magnetic states of ten successive zones or cells along the recording track of the latter. Although the relationships between such units of "measurement" have been expressed with particular reference to a GCR type recording code, it should be understood that the relationships with other self-clocking type, nybble handling codes are directly analogous for purposes involving the "space" required for recording a given amount of information or the like; and, as the description of this invention proceeds, those skilled in the art will perceive that, although it is convenient to utilize the well-known type of encoding units now in most common usage (i.e., 4-bit nybbles of 8-bit bytes of internal code and 5-bit groups of recording code to provide a self-clocking magnetic representation for each nybble of internal code), the invention is in no sense so limited and can be adapted for handling information represented by groups containing a different number of information significant bit values (although it will, of course, be necessary to provide one or more additional bits in the recording code as compared with the internal code groups it is to represent, if the required number of legal recording codes is to be available for representing all permutations of the internal information code groups, while preserving self-clocking characteristics in the recording code).

The final, highly relevant, topic of general background interest, particularly for those who may not be familiar with such details of past and current, magnetic storage technology, is concerned with the overall arrangement or formatting of magnetically recorded, physical representations of information upon a track of a disc medium. In such regard, reference is made to FIG. 1, wherein a typical, conventional utilization of the various protions of one of the annular, recording tracks 10 upon a recording surface 12 of a magnetic disk medium (such as a "floppy disk") is schematically depicted (with the microscopic width of the track 10 obviously greatly exaggerated). It will be understood that the markings along the track 10 illustrated in FIG. 1 are intended merely to delineate boundaries for portions of the track 10 to be discussed herein, rather than representing any visible aspect of such portions, which carry information magnetically recorded within their bounds on the surface 12; and, in fact, the track 10 itself essentially represents merely the locus of juxtaposition with the surface 12 of one particular radial positioning of the read/write heads of a disk drive unit during relative rotation between the disk medium and the heads.

One definitely physical and usually visible feature of the surface 12 of a typical disk medium, however, is the presence of some form of "hard index" structure, such as depicted in FIG. 1 as a hole 14 through the disk surface 12. In existing disk drive units, some form of electrooptical or other sensor and associated circuitry must be provided for detecting the moment when the hard index structure 14 arrives at a given rotational position thereof, since previous disk technology employs and requires the presence and detection of some form of such hard indexing structure 14 that is recognizable optically, magnetically or otherwise to mark the point on the circumference of the track 10 (and all other tracks on the surface 12) at which the recording of information must always commence to permit satisfactory subsequent retrieval thereof. In FIG. 1, such hard index point of the track 10 is represented by the line 16, which it will be noted is pointed to by a draftsman's arrow 18 radially aligned with the hard index structure 14.

It should be understood that the direction of rotation of the surface 12 and track 10 relative to the read/write heads of the disk drive unit is assumed to be counter-clockwise as depicted in FIG. 1, so that the first longitudinal portion of the track 10 "following" the hard index point 16 of the track 10 is the track portion 20, which includes what are commonly referred to as the "Post Index Gap", the "Index AM (address mark)", and a part of "Gap 1". To illustrate with reference to a typical, conventional, magnetic disk recording format known as the "IBM 3740 Format", the portion 20 would include a recording code representation of 40 information bytes of all bits each equal to binary 1, followed by 6 bytes of all 0 bits, followed by 1 byte of a code group representing the Index AM, followed by 26 more bytes of all 1 bits, for a total length in bytes for the portion 20 of 73 bytes.

Next following the portion 20 in the conventional format for arranging information magnetically recorded on a disk track 10 are a plurality of successive portions 22, commonly called "sectors", each including both a data representation part and further "gaps". In the IBM 3740 Format mentioned as typical, there are 26 portions or sectors 22 successively disposed around the track 10 to the point where the hereinafter discussed portion 24 begins, and each portion 22 is of an identical length of 186 bytes, of which 128 bytes contain representations of data information to be recorded, 50 bytes are gaps containing "all 1's" or "all 0's", and the remaining 8 bytes are used for representations of codes for identifying the track and sector numbers, for marking the start of the data field, for a check sum field and the like. Thus, of the total of approximately 4836 bytes available in the 26 sectors 22 around a track 10, 1300 bytes are "wasted" on gaps (although they are needed in the conventional format for "resynchronizing" the read clock prior to each data field), leaving only 3538 bytes for useful information (including the 8 bytes of identification and miscellaneous other information included in each of the sectors 22).

Finally, with conventional formatting, the last of the sectors 22 is separated from the hard index point 16 of the track 10 by a so-called "Pre-Index Gap" 24, which consists of successive bytes of "all 1's" recorded until the hard index structure 14 is detected and, in the IBM 3740 Format, typically including at least 247 of such gap bytes. It will be observed, therefore, that out of the over 5080 bytes of "recording space" typically available on the track 10 with the disk surface being rotated at the design speed of the associated drive unit, only 3328 bytes are conventionally utilized for data fields with the IBM 3740 Format. The last-mentioned format has been cited for illustration and as typical because it is one of the most widely known and used arrangements for single density recorded disks; however, other conventional sectored formats are characterized by comparably low efficiency of usage of available "track space" for representations of the actual data to be stored and retrieved, including, for example, double density recording formats such as the so-called "IBM System 34 Format" in which the portions 20, 22 and 24 are each comparable in content but approximately double the length of those noted for the IBM 3740 Format (yielding about 6656 bytes of data fields out of a total nominal "track space" of about 10364 bytes).

The Improved Format

In contrast with the conventional format or arrangement for magnetically recording physical representations of information on a storage disk medium exemplified by FIG. 1 and the foregoing explanation thereof, attention is next directed to FIG. 2, wherein the improved overall arrangement provided by this invention is schematically depicted in form intended to be as nearly comparable to FIG. 1 as feasible. In FIG. 2, the track and the recording surface of a disk medium are respectively identified by the reference numerals 30 and 32, and it may be understood that the track 30 is assumed to be in all ways identical to the track 10 except for the overall arrangement and content (in a macro sense) of the information representations magnetically recorded thereon.

The first difference that should be apparent is the absence of any hard index structure (corresponding to the hole 14 in FIG. 1) upon the disk surface 32. This invention can, of course, be used with existing disk media that might still have a hole 14 or some other form of structural provision for hard indexing, and its presence would not impair use of such old form of disk in implementing this invention; the point to be understood, however, is that the improved format provided by this invention does not utilize and eliminates any need for any such hard index structure or means for detecting the same, thereby simplifying and permitting economies in the manufacture of both disk media and their associated drive units.

In the improved arrangement of the representation of information recorded on the track 30, the point at which the recording of the illustrated representation was commenced is identified by the reference numeral 36; however, it is to be understood that the point 36 is not in any predetermined alignment or juxtaposition with any hard index point or the like either on the surface 32 or along the track 30. In fact, the point 36 of commencement of recording is not at any predetermined, fixed location along the track 30 and will normally be at a different location along the track 30 each time a new representation of information is recorded on the track 30. Those skilled in the art will appreciate that this aspect of the improved format, of itself, eliminates the delay or "latency time" heretofore universally experienced with conventional disk storage practices in waiting for the disk medium to rotate to a particular position at which a hard index structure is detected before a recording operation can commence.

The first portion 40 of the track 30 to be recorded with the improved format is what may be called a "leader field" consisting of a "synchronization portion" containing a predetermined number of GCR type code groups containing control information for producing an uninterrupted series of successive flux transitions in the magnetically recorded representation for use in initial synchronization of the read clock of an associated controller and for a second purpose explained hereunder, followed by a single GCR type code group representing a "start of data field mark". The succession of flux reversals required for synchronization are conveniently provided, as hereinafter further explained by alternating recording code groups of "01010" and "10101". Such continuing flux transitions are not only reliably detectable, but also are easily and accurately countable within the associated controller by means of known circuitry techniques for purposes hereinafter noted. Since, once the read clock has been initially synchronized, the absence of a flux reversal at the end of the code group next following the series of flux reversals characterizing the synchronizing field is also reliably detectible by known circuitry techniques, it is convenient to employ for the start of data field marker the 5-bit GCR type code group "01011" (the last two bits of which will be magnetically represented as a pair of cells of the same polarity presenting an easily recognizable absence of flux transition).

The second portion 42 of the track 30 to be recorded directly following the portion 40 in the improved arrangement is the "data field", which extends continuously around the track 30 to the pont 46 marking the beginning of a "trash gap" 48. On a typical "floppy disk" medium employing single density recording clocking, the data field 42 may contain of the order of 5000 data bytes (10000 nybbles or 5-bit recording code groups occupying 50000 magnetically significant zones along the track 30), without interrupting gaps, or, with double density recording, may contain of the order of 10000 data bytes in uninterrupted succession. The difference, as compared with conventional sectored data representation formats for comparable media providing of the order of 3328 data bytes per track with single density recording or of the order of 6656 data bytes per track with double density recording, represents a significant enhancement in utilization of the available recording "space" in each track.

The trash gap 48 of the improved format is simply a stretch of the track 30 on which nothing new is recorded, but which may still bear a portion of the magnetic representation of information recorded on the track 30 during a previous use of the latter for storing other data and its associated synchronization information. The physical length (and thereby the information storing capacity) of the gap 48 may vary, but only within predetermined limits, due to variations in the speed at which the associated drive unit is rotating the disk surface 32 relative to the associated write head during each new information recording operation. Such limits are determined as a direct function of the amount of variation in such speed that is expected and will be tolerated as within the normal operation of the particular type of drive unit to be employed. Quality grade, modern disk drive units have improved the level of uniformity of the speed at which the disk medium is rotated sufficiently from what was experienced with earlier drives that it is now reasonable to illustrate the relationship of drive speed variations to the invention in terms of an expected and "normal" variation of such speed of, say, not more than plus or minus 1% of the nominal or design operating speed (any variation beyond that tolerance being treated as symptomatic of a mechanical fault in the drive unit or the power source from which it is energized). It should be understood, however, that the invention is not limited in application to systems having the particular drive unit speed tolerance now chosen for the sake of illustration, significant advantages still being realized by the improved format provided by the invention even where broader ranges of drive speed variation must be accommodated as tolerable with older or lower quality drive units, it also being anticipated that further improvement in the design and construction of disk drive units in the future may permit adjusting the parameters of the improved format to an even tighter speed variation tolerance range.

To illustrate the quantitative aspect of the effect of "normal" drive speed variation upon the size of the portions 40 and 42 of the improved format and the size of the trash gap 48, however, and assuming a speed variation tolerance of plus or minus 1% from nominal operating speed, consider a disk storage device in which, with the medium rotating at nominal design speed and with double density clocked recording being used, each recording track 30 of the disk has a capacity for storing a total of, say, 11008 bytes (22016 nybbles or 5-bit recording code groups) of information representations on each track 30 of the disk. With a plus or minus 1% speed tolerance to be accommodated, it will be clear that the "unformatted" capacity of each track 30 may vary from a permissible minimum of about 10897 bytes (21794 nybbles or 5-bit recording codes) at maximum tolerable drive speed to a permissible maximum of about 11119 bytes (22238 nybbles or 5-bit recording codes) at minimum tolerable drive speed. Determination of suitable lengths for the leader field 40 and the data field 42 to assure that the length of the trash gap 48 will remain within suitable limits may proceed as follows.

The primary guiding constraint to be adhered to is that the mentioned parameters must be selected in such a manner that the length of the trash gap 48 will never equal or exceed the length of the synchronization portion of the leader field 40 (because the flux reversals provided by the synchronization portion of the leader field 40 during reading are counted before recognition of the start of data marker is enabled, so as to prevent an invalid reading operation being triggered by "leftover" information still recorded in the trash gap 48 from a previous usage of the track 30 for other information), and the length of the trash gap 48 must be equal to or greater than 0 (so as to prevent some terminal portion of the data field 42 from being written over a portion of the synchronization field 40 during recording). With the numbers assumed for purposes of illustration, it will be convenient for the leader field 40 to include 255 and ½ bytes (511 nybbles or 5-bit GCR type code groups) of snychronization code followed by ½ byte (1 nybble or 5-bit GCR type code) for a start of data marker, for a total of 256 bytes for the entire synchronizing and start of data mark field 40. Subtracting such 256 bytes from the minimum unformatted capacity of the track 30 of 10897 bytes leaves 10641 bytes for the data field 42 and the trash gap 48, while subtracting such 256 bytes from the minimum unformatted track capacity of 11119 bytes leaves 10863 bytes for the combined length of the data field 42 and the trash gap 48. Thus, a data field 42 as long as 10640 bytes leaves at least 1 bare byte to spare while conforming to the mentioned criteria of constraint, although it is preferred to provide a somewhat greater margin of safety, and a length for the data field 42 of, say 10624 bytes would be recommended, which would provide a leeway of 16 or 17 bytes for the length of the trash gap 48 under both plus and minus 1% variations of speed from the nominal rotational operating speed of the drive unit. For a track 30 to be recorded with single density clocking, and again assuming a plus or minus 1% tolerance for the speed of the drive unit, the last-mentioned figures could be easily halved, and it should be apparent both that the determination of the proper length for the leader field 40 before the data field 42 may be easily predetermined in a similar fashion for a track 30 of any given unformatted total capacity and for recording at any selected density, and that the involved overall format of the invention will provide in all such cases a greatly increased ratio of the portion of a track 30 utilized for actual storage of data to the total unformatted capacity available from such track 30.

THE IMPROVED METHOD AND APPARATUS

What may be regarded as one significant aspect of the methodology of the invention, relating to the relative sizing of the leader field 40, the data field 42 and the trash gap 48 for accommodating the improved overall information representing format provided by the invention to disk tracks 30 of various unformatted capacities and recording densities and to various ranges of tolerable variation in the speed of rotation of a disk medium by its drive unit, has just previously been explained.

A collateral, but related, aspect of the such methodology is that for computer systems employing tape as well as disk type, magnetic storage devices, the same format and sizing parameters for the leader field 40 and the data field 42 as have been determined and selected for use with the disk type storage devices of the involved system can also be employed for magnetically recording information representations onto the tape type storage devices utilized in the same system. As will hereinafter become more apparent, this facet of the improved methodology provided by the invention has significant practical advantages in permitting either identical controllers to be used for both disk and tape type storage devices or the same controller to be literally switched between connections thereof with a disk device or with a tape device for controlling either. The only difference, then, between utilizing disk media or alternately using tape media is that, whereas one "format-full" of information representations (i.e., a leader field 40 followed by a data field 42) is recorded on each track 30 of a disk medium so that a long information file may occupy several of the tracks 30 (as it also would, to a greater extent, with now conventional formatting), a plurality of "formats-full" of information representations are simply recorded successively along the longer track of a tape medium. Not only is the improved format of nature for inherently containing a relatively large amount of actual data information in each "format-full", so as to be comparatively efficient when used on any tape type storage device, but also is especially adapted for use with some of the more recently developed tape storage devices, such as those of the so-called "streamer" type, wherein gaps between records (or "formats-full") can be minimized or eliminated.

The remaining aspects of the methodology provided by the invention, as well as the preferred combination of apparatus for implementing the improved format and the related methodology, can be conveniently discussed together, for which purpose reference is now made to FIG. 3.

The block type diagram of FIG. 3 illustrates the application of the invention to a computer system, with emphasis upon the combinational aspects of the apparatus involved. Electrical signal paths for information representation flow between functional modules are shown in solid lines, expanded laterally when appropriate to indicate multi-conductor, parallel paths, and with arrowed heads to indicate directions of primary flow. Control paths or relationshps are shown in dotted lines, without distinction as to the number of electrical connecting leads that might be employed for a given control relationshp, but with arrowed heads to indicate directions of primary control dominance.

The overall system chosen for illustration includes, as the principal functional blocks or modules thereof, an "host" computer 50, a bidirectional buffer or temporary storage memory 52 provided with an incrementable address register 53 for receiving information from or making information available to the computer 50, a data selector 54 for accessing data information stored in the buffer 52 during a write operation, an encoder 56 and associated selective inverter 57 for reencoding data information from the data selector 54 expressed in internal computer code into a self-clocking recording code (preferably of the GCR type) during a write operation, a parallel-to-serial converter 58 for converting information from the encoder 56 via the inverter 57 expressed in recording code in parallel bit signal form into a serial bit signal form of the same code during a write operation, a mode control counter 60 for controlling certain aspects of the operation of the data selector 54 and the inverter 57 in correlation with a count of the number of units of control information representations that have been fed by the data selector 54 to the encoder 46 during a write operation, a write clock 62 for providing synchronizing or clocking signals of the proper intervals for recording at the desired density directly to the converter 58 and also via a divide-by-five pulse divider 63 to the converter 58 and the counter 60 during a write operation, a single bit latch 59 for feeding back the last serial bit of each bit group output by the converter 58 to the inverter 57 as a signal during writing, at least one magnetic disk storage unit 64, optionally one or more magnetic tape storage units 66, optionally a switching module 68 for alternately effecting signal path connections with a disk unit 64 or a tape unit 66 during either a write or a read operation, a serial-to-parallel converter 70 for receiving and converting information expressed in recording code in serial bit signal form from the disk unit 64 or the tape unit 66 into a parallel bit signal form of the same code during a read operation, a read clock 72 for "regeneratively" providing clocking signals at intervals synchronized with and controlled by the self-clocking information derived from the recording code information being read from the disk unit 64 or the tape unit 66, a preamble and start of data detection module 74 including an associated EXCLUSIVE OR gate 73 for detecting the reading of a complete synchronizing portion of field 40 followed by a start of data code marker group during reading and for controlling a divide-by-five, latch control counter 76 in accordance therewith, a selective inverter 78 for complementing certain GCR type code groups received from the converter 70, a single bit latch 79 for providing a control signal to the inverter 78 from the "last" bit of each GCR type code group from the converter 70, a decoder 80 for decoding information expressed in recording code in parallel bit signal form from the inverter 78 into internal computer coded 4-bit groups during a read operation, and a data latch 82 for feeding data information from the decoder 80 expressed in internal computer coded bit groups to the buffer 52. The signal and control paths between such modules, by which the latter are functionally interrelated and coordinated for implementing the invention, will be identified and their relevant aspects discussed as this description proceeds with a somewhat more detailed consideration of the nature, purpose and operation of the individual modules of the combination just hereinabove noted.

It may first be noted that the write-related modules 54, 56, 57, 58, 59, 60, 62 and 63, and the read-related modules 70, 72, 73, 74, 76, 78, 79, 80 and 82, preferably along with the buffer module 52 and its address register 53, comprise what is referred to as an input/output controller 90 for bidirectionally linking the computer 50 with the disk unit 64 and/or the tape unit 66. In any given system, there may be a plurality of the controllers 90, depending upon the number of peripheral magnetic storage devices 64 and 66 being employed.

The computer 50 may be of any conventional type and will typically include an arithmetic/logic unit for processing information encoded in an internal computer code in various ways, a main memory for the temporary storage and accessing of information representing both data and programming instructions also encoded in an internally recognizable code, and various internal information and control signal carrying paths, including at least one multiconductor signal path frequently referred to as an "input/output bus" represented in FIG. 3 by the wide, bidirectional arrow 100. It is via the bus 100 that information is transferred from or to the computer 50 during communication with peripheral devices, such as during writing information to or reading information from the disk unit 64 and/or the tape unit 66. The number of conductors providing parallel signal paths within the bus 100 may vary with the particular type of computer 50 being employed but will typically include a number of such paths equal to some power of 2, such as eight conductors for carrying in parallel electrical signals representing the eight information bits of a byte of information in internal code, sixteen conductors for carrying in parallel a 16-bit word including two associated bytes of such information, or thirty-two conductors for carrying a double word of 4 associated bytes of such information concurrently or in parallel. For simplicity of further explanation, it may be assumed that the input/output bus path 100 is adapted to carry in parallel and in either direction eight electrical signals representing a byte of information encoded in an internal code recognizable by the computer 50.

In the currently preferred implementation, the buffer 52 will be provided as a part of each controller 90, although those skilled in the art will recognize that a portion of the main memory and an internal address register of the computer 50 could alternately be utilized for performing the functions of the buffer 52 and register 53, if desired. In the preferred construction, however, the buffer 52 comprises a block of auxiliary memory, electronically implemented in any conventional fashion, as with RAM or random access memory components, into which information encoded in an internal code compatible with the computer 50 can be temporarily stored and from which such information may be selectively accessed in desired units each including a predetermined number of bits of such information by appropriately incrementing the address register 53. The buffer or auxiliary memory 52 will also conventionally include suitable address incrementing circuits, driver circuits and the like. Appropriate incrementing of the register 53 permits bytes of information from the computer 50 to be stored into successive bytes of the buffer memory 52, as well as permitting such information to be subsequently accessed from the buffer memory 52 as a series of 4-bit nybbles for convenience in further encoding the same into a self-clocking type recording code such as the preferred form of GCR. The addressing circuitry of the buffer 52 employing the register 53, when appropriately incremented, is equally adept at storing 4-bit nybbles of information as a succession of same in the order they are received and for subsequently accessing the same in appropriate pairs thereof as a series of successive bytes. During an operation for writing information to a peripheral magnetic storage unit 64 or 66, the incrementing of the register 53 to address successive bytes of the buffer memory 52 for the storage of a series of information bytes from the computer 50 therein will be under the control of the computer 50 via the control path indicated in FIG. 3 by the dotted line 200, and the incrementing of the register 53 to address the buffer memory 52 for accessing therefrom a series of successive nybbles of information will be under the control of the counter 60 via the control path 202, which is the relevant mode of addressing the buffer 52 in conjunction with an operation for writing information therefrom to one of the magnetic storage units 64 or 66. Conversely, during an operation for reading information from one of the units 64 or 66, the incrementing of the register 53 to address the buffer 52 for storing successive nybbles of information in the latter will be under the control of the counter 76 via the control path 204-206, while the subsequent transfer of such information from the buffer 52 to the computer 50 as successive bytes of information will be controlled as to incrementing of the addressing register 53 within the buffer 52 by the computer 50. Although the buffer 52 is thus electronically implemented in a conventional fashion, it differs from the buffer memories heretofore typically employed in controllers for magnetic storage devices, in that, the buffer 52 of the controller 90 embodies an auxiliary memory having a much larger total storage capacity, namely, a capacity sufficient to concurrently hold the amount of information in internal code required to provide the recording code representations for an entire data portion 42 of the previously described, improved format for the recording of information upon each track 30 of the type of magnetic storage disk medium handled by the unit 64 to be utilized in the system. Thus, a controller 90 for use with one commonly available, Winchester, hard disk type media to be recorded with double density clocking would be provided with a buffer memory 52 having a storage capacity and addressing capability for accommodating, say, 10624 bytes or 21248 nybbles of internally coded information.

The successive 4-bit nybbles of information accessed from the buffer 52 during a magnetic write operation are carried to the data selector 54 in the form of the signal levels upon four parallel, electrical conductors represented in FIG. 3 by the widened arrow 102, which provides the unidirectional path for information transferred from the buffer 52 to the data selector 54.

The operation of the data selector 54 for each given incidence of the task of writing one format-full of data information to a magnetic peripheral unit 64 or 66 is initiated by appropriate control signals from the computer 50 to the mode control counter 60 via the control path 208, which, of course, will occur after the computer 50 has completed fully loading the buffer 52 via the information path 100 with a format-full of data information to be magnetically stored upon either of units 64 or 66. Upon initiation of a write cycle by the cylinder 50, the mode control counter 60 commences counting electrical pulses generated by the write clock 62 and counting electrical pulses received via the control path 210 from the divider 63, corresponding to every fifth clock pulse generated by the write clock 62 and fed to the divider 63 via control path 212. It will be perceived that each pulse thus counted by the counter 60 corresponds to one nybble of information to be fed from the data selector 54 to the encoder 56 and, in the case of data information, to be first transferred from the buffer 52 to the data selector 54. The write clock 62 will conventionally be a crystal controlled oscillator with pulse forming circuitry at its output and adjusted to oscillate at a predetermined, fixed frequency appropriate to the density of recording to be employed, the type of magnetic disk storage medium to be utilized and the speed at which the latter will be rotated by the unit 64. The counter 60 is adapted upon reaching certain predetermined count values to produce corresponding control signals communicated to the data selector 54 via the control path 214.

The data selector 54 itself performs three functions. First, until the selector 54 has received from the counter 60 via the control path 214 a signal indicating that the counter 60 has counted a first predetermined number of pulses from the divider 63 (equivalent to the number of nybbles of synchronization code to be provided in the leader field 40), the selector 54 will feed 4-bit nybbles of all "1's" from a hard-wired source 104 thereof to the binary-to-GCR type encoder 56. In implementing the previously described illustrative example of the improved format in which the synchronizing portion of the leader field 40 extends for a length of 255½ bytes or 511 nybbles, the data selector 54 would successively feed 511 nybbles of all "1's" to the encoder 56 until the counter 60 had counted that number of pulses from the divider 63 and had communicated that fact to the selector 54 by an appropriate signal along the control path 214. Secondly, when the last-mentioned control signal (indicating completion of the transfer of 511 nybbles of synchronizing information from the selector 54 to the encoder 56) is sent to the data selector 54 from the counter 60, the previous state of the control path 214 is altered to a second condition during an interval of a single count (i.e., from 511 to 512), which causes the selector 54 to feed a single "1110" valued nybble from a hard-wired source 106 thereof to the encloder 56 for representing the start of data marker. Thirdly, upon the counter 60 having achieved a count equivalent to 512 nybbles, the signal state upon the control path 214 is again altered to initiate the data selector 54 to commence successively accessing nybbles of data information from the buffer 52 via the information signal path 102, while the counter 60 increments the register 53 to control the addressing of the buffer 52 via the control path 202, and to transmit such successive nybbles of data information to the encoder 56 via a 4-conductor information path 108. Such last-mentioned mode of operation will continue until that predetermined number of nybbles required for the entire data information field 42 of the improved recording format (say, 21248 nybbles) has been accessed from the buffer 52 and transferred to the encoder 56 by the data selector 54; such operation may conveniently be terminated by the counter 60 resetting and disenabling itself upon attaining the appropriate total count (say, 21760 for a leader field 40 of 512 nybbles and a data field 42 of 21248 nybbles).

The encoder 56 receives parallel, 4-bit nybbles of information representing half-bytes still encoded in an internal code compatible with the computer 50 via the information path 108 and has for its primary purpose the conversion of those 4-bit nybbles of information into 5-bit code groups to be output to the inverter 57 via the information path 110 as binary valued electrical signal levels upon five parallel conductors within the information path 110. As will shortly be further explained, the encoder 56 and the selective inverter 57 function cooperatively in accomplishing the overall encoding operation required to translate the 4-bit nybbles of information from the selector 54 into GCR tpe 5-bit code recording groups of the preferred kind.

The encoder 56 is most conveniently implemented through the employment therein in conventional fashion of a block of ROM having sixteen 5-bit cells of permanent or read only memory each storing one of sixteen 5-bit codes adapted, upon selective modification by the inverter 57 as hereinafter described, to present the GCR type recording code to be used for creating a magnetic representation of the information to be stored on a disk or tape medium, together with the usual associated addressing and driver circuitry for utilizing the 4-bit nybble of information signals from the data path 108 as an address for uniquely accessing a corresponding one of the cells of the ROM to deliver a corresponding 5-bit parallel signal output to the inverter 57 via the information path 110.

The inverter 57 is conveniently implemented with five 1-bit inverter components and conventional switching circuitry for selectively either passing the five input signals received from the encoder 56 via the 5-bit data path 110 on to the parallel-to-serial converter 58 via the 5-bit data path 112 in uncomplimented or unchanged form or passing the "1's compliment" of such input signals on to the converter 58 via the same path, depending upon the states of two control signals fed to the inverter 57. The first of such control signals is provided by the mode control counter 60 via the control path 216 and has two states respectively indicating control mode operation while the counter 60 is counting nybbles for the leader field 40 and data mode operation while data from the buffer 52 is being recorded in the field 42. The second of such control signals is provided by the 1-bit latch 59 via the control path 218 and has two states respectively indicating whether the last bit of the previous 5-bit code group to be serially output by the converter 58 was a "0" or a "1". When the control signal to the inverter 57 via the control path 216 is in the state thereof invoking control mode operation, then, when the control signal to the inverter 57 via the control path 218 corresponds to a "last bit of previous group" value of "0", the inverter 57 compliments all bits of the 5-bit group it is processing before feeding the same to the converter 58, but passes the group being processed to the converter 58 in uncomplimented form when the "last bit" control signal corresponds to a value of "1" for such bit. Conversely, when the control signal on path 216 is in a state invoking data mode operation, a "last bit" value corresponding to "1" along the control path 218 will cause the inverter 57 to compliment all five bits of the data being passed to the converter 58, while a "last bit" value of "0" will not.

At first impression, it might seem to those not particularly familiar with the generation of recording codes that the inverter 57 is superfluous and one could just as well store all needed recording code groups directly in ROM cells of the encoder 56—and that could, of course, be done with appropriate expansion of the ROM and suitable modification of the addressing and driver circuitry within the encoder 56. However, it is believed those more intimately skilled in this art will recognize that the preferred method of generating 5-bit, GCR type, recording code group from 4-bit nybbles of information from the selector 54 and the control input available from the counter 60, as herein described, represents a striking simplification as compared with what has heretofore been commonly regarded as necessary to implement GCR type or other RLLC encoding. Indeed, by virtue of the complexity and cost of the conventional approach to implementing GCR type encoding employing only a ROM encoder and associated logic circuitry for appropriately controlling the addressing thereof in accordance with various state conditions corresponding to particular phases of the storage or retrieval process, GCR codes, despite their other advantages, have heretofore been used primarily only in relatively expensive tape medium type equipment. The selective complementing of individual code groups implemented in accordance with this invention, however, achieves the simplification and reduction of costs needed to render feasible GCR type encoding even in controllers for disk type storage units of moderately priced computer systems.

The encoding function accomplished through the joint action of the encoder 56 and the selective inverter 57 during writing (and the corresponding decoding functions of the selective inverter 78 and the decoder 80 during reading) should be further clarified by the following Table I, wherein is shown the binary nybble internal code to GCR type code, and vice versa, correspondence actually employed in the currently preferred embodiment of the invention.

TABLE I

| 4-bit Information Code Group | Uncomplemented 5-bit Recording Code Group | Complemented 5-bit Recording Code Group |
|---|---|---|
| 0000 | 10001 | 01110 |
| 0001 | 10010 | 01101 |
| 0010 | 11100 | 00011 |
| 0011 | 11101 | 00010 |
| 0100 | 10110 | 01001 |
| 0101 | 11001 | 00110 |
| 0110 | 11011 | 00100 |
| 0111 | 11010 | 00101 |
| 1000 | 10011 | 01100 |
| 1001 | 01110 | 10001 |
| 1010 | 01100 | 10011 |
| 1011 | 01101 | 10010 |
| 1100 | 10100 | 01011 |
| 1101 | 01001 | 10110 |
| 1110 | 01011* | 10100 |
| 1111 | 01010** | 10101*** |

Note:
*Used for Start of Data Marker, as well as for Data.
Used alternately with * for pre-data Syncronization Leader Field as well as for Data.

In the table, the left column lists the sixteen 4-bit binary codes needed for expressing nybbles of information in "half-byte" internal coded form; the middle column lists the corresponding sixteen 5-bit recording codes in which the respective 4-bit codes of the left column are expressed as recording codes when no complementation is invoked; and the right column lists the corresponding sixteen 5-bit recording codes in which the respective 4-bit codes of the left column are expressed as recording codes when complementation is invoked. As previously noted, the mapping between the left column and the middle and right columns is arbitrary and could be changed. It should be noted that the seventeen 5-bit recording codes which would be "legal" in uncomplimented form in accordance with the "self-clocking constraint" previously mentioned are the codes appearing in the middle column, plus "10101" from the right column (the latter actually being produced by complementation in the preferred embodiment). It should also be observed that the right column includes several recording codes (e.g., "00011", "00010", "00110", "00100" and "00101"), which are also rendered "legal" as complemented codes pursuant the scheme of control implemented for the selective complementing previously described, although they would not be "legal" if allowed as uncomplemented codes.

The successive 5-bit recording code groups from the selective inverter 57 are fed via the information path 112 to the parallel-to-serial converter 58, which serves to convert the same into a stream of successive serial bits each applied to a serial recording code information path or line 114. The converter 58 may be conventionally implemented by any of the known types of electrical circuitry for that purpose, for instance a clocked shift register, it being noted that clock pulses are supplied to the converter 58 from the write clock 62 via the control path 220 and from the divider 63 via the control path 222-224. The use of clocking pulses derived in common from the write clock 62, via the control paths 212 and 220, and secondarily from the divider 63 via paths 210 and 222-224, assures coordinated timing of the operations of the counter 60 (and hence the data selector 54) and the converter 58 during each information recording cycle of the controller 90.

The single bit data latch 59 receives each bit serially output to the line 114 by the converter 58 via the data path 116, but is enabled by the "group clock" signal from the divider 63 via the control path 222-226 to output to the inverter 57 only a control signal representing the "0" or "1" value of the fifth or last bit of each 5-bit group serially output by the converter 58. Such control signal from the latch 59, along with the control signal from the mode counter 60 via the path 216, determines and controls the invocations of the complementing function of the selective inverter 57, as previously explained. Thus, the recording code groups output to the line 114 by the converter 58 as a series of bits or successive periods of binary valued electrical signal levels correspond to the recording code sequences noted in the middle or right columns of Table I, depending as to each such group upon whether the selective inverter 57 has been actuated to complement that group.

For the sake of emphasizing the adaptability of the controller 90 for use in interfacing between the computer 50 and either a disk type, magnetic storage medium drive unit 64 or a tape type, magnetic storage medium, drive unit 66, the write/read, serial information line 114 is illustrated in FIG. 3 as leading to the common terminal 92 of the switching assembly 68, which also has a pair of switched terminals 94 and 96 adapted to be selectively connected with the terminal 92. The optional switching assembly 68 is preferably implemented with conventional electronic logic gate circuitry, so as to be controllable by the computer 50 via the control signal path 228, although a manual switch could manifestly also be employed for the switching assembly 68.

Each of the magnetic disk unit 64 and the magnetic tape unit 66 conventionally includes internal read and write heads, means for supporting the compatible type of magnetic stroage medium and moving the same relative to the read and write heads, power circuitry for energizing the drive motor, and the usual internal motor activate and read/write control circuitry, the latter of which is adapted to be controlled by the computer 50 via the control paths 230 and 232 respectively. The terminal 94 of the switching assembly 68 is coupled with the read/write head circuitry of the disk unit 64, and the terminal 96 is similarly coupled with the read/write head circuitry of the tape unit 66. For simplicity of illustration, only single lines are shown as being employed to provide serial information paths to and from the units 64 and 66 both during writing and reading, although separate read and write lines could be employed in practice, if desired.

In any event, assuming connection of the line 114 with the disk unit 64 during a write cycle of the controller 90, the previously described, cooperative actions of the modules 52, 54, 56, 57, 58, 59, 60, 62 and 63 will successively apply to the write head of the unit 64 a series of electrical signals of binary valued levels and of durations vis-a-vis the clocking frequency of the write clock 62 to magnetically record in successive zones along the track 30 the information to be written onto the disk in the form of a series of zone of distinctive magnetic polarity presenting occurrences and absences of magnetic polarity reversals between adjacent pairs of such zones. Significantly, such writing operation may commence at any point 36 along the length of the recording track 30 of a disk medium. At the lowest level of consideration, the presence or absence of a flux reversal between each pair of adjacent zones along the track 30 represents a binary information value of 1 or 0 respectively. At a somewhat higher level of context, each series of five successive occurrences or absences of such flux reversals represents a legal, 5-bit, GCR type, recording code group, in turn representing either one 4-bit nybble of logic information or a special code used for initial synchronization and control during subsequent reading. At the highest level here of interest, the entire series of successive occurrences or absences of such flux reversals extending nearly the entire length of the track 30 (except for the variable final gap 48) represents the leader or preamble field 40 of the improved recording format containing initial read synchronization information and the start of data marker, followed by the data field 42 of the imporved format containing the data being stored on the disk medium (as well as embedded self-clocking control information). If the line 114 is connected by the switching assembly 68 to the write head of the tape unit 66, the information recorded and the encoding and physical representation thereof is identical to that just described for recording on a disk type medium, except that successive "formats-full" of information will be recorded successively along the length of the track of a tape type medium, rather than upon different tracks 30 as with a disk type medium.

As with writing information to be magnetically stored on a moving medium according to this invention, the operation of subsequently reading such information is also essentially the same for either disk or tape type media, and specifically may be handled by the read operation related modules 70, 72, 73, 74, 76, 78, 79, 80, 82 and 52 of the same controller 90, as next further described, or by an identical such controller 90.

Assuming that an operation for reading information recorded upon a track 30 of a disk medium mounted in the drive unit 64 is to be performed, the computer 50 will actuate the switching assembly 68 via the control path 228 to connect the line 114 with the read head of the disk unit 64 and will send other appropriate control signals to the unit 64 via the control path 230 to start the motor within the unit 64 for rotating the disk mounted therein and to otherwise adapt the internal read/write circuitry of the unit 64 for a reading operation. The read head within the unit 64 will thereupon immediately commence to sense changes and absences of change in the flux polarity between adjacent zones along the track 30 of the rotating disk medium and to feed the same as electrical signals of levels corresponding to the presence or absence of flux reversals to the line 114 via the switching assembly 68. Since such a reading operation may be initiated by the computer 50 with the rotating disk in any random position of rotation thereof, typically not coinciding with alignment of the read head of the unit 64 with the beginning point 36 of the information recorded on the track 30, an initial sequence of such signals fed to the line 114 must be disregarded before the beginning point 36 is reached by the read head, in order to avoid transferring to the buffer 52 other than the appropriate data information in the proper sequence in which it is to be read. Accordingly, when initiating a read operation, the computer 50 sends appropriate enabling and resetting signals, directed along the control path 234 to the read control counter 76. At the same time, the signals upon the line 114 are being fed to the read clock 72 via a lead 118 and to the serial to parallel converter 70 via a lead 120.

The read clock 72 may be of any of those conventional types having circuitry adapted to establish and continually adjust the interval of the clocking pulses being produced to an external source of synchronizing pulses occurring either at the required interval of time or at some small multiple thereof. During a reading operation, the external sync pulse input to the clock 72 is derived via the lead 118 from the line 114 and corresponds to the occurrences of flux reversals along the track 30 being read. As the read clock 72 continues to receive the serial signals from the line 114 representing the successive bits of successive groups of recording code information being read from the track 30, the frequency of the clock pulse output therefrom to the preamble and start of data detector 74 via control path 236 and to the read control counter 76 via control path 238 will rapidly stablize in correlation with the speed at which information is being read from the disk (which is, in turn, dependent upon the speed at which the disk is actually being rotated by the unit 64). The control counter 76 does not immediately commence counting clock pulses from the read clock 72, however, but rather awaits an enabling control signal from the detector 74 via the control path 240. The serial-to-parallel converter 70, on the other hand, will immediately commence to receive clock pulses from the clock 72 via the control path 242.

The serial-to-parallel converter 70, like the parallel-to-serial converter 58, may be conveniently implemented with a shift register, although whereas the converter 58 received successive parallel 5-bit groups from the data path 112 and shifted the bits of each such group from cell to cell of its 5-bit register and then serially from one end of the latter onto the information line 114, the converter 70 serially receives bits from the information line 114 and shifts the same into one end and from cell to cell of its 5-bit register (with the "oldest" bit being discarded from the other end), so that a 5-bit parallel output, which changes with each clocked shifting operation and the entry of each new bit from the line 114, is continuously presented upon the parallel 5-bit data path comprising the five conductors 122, 124, 126, 128 and 130 leading to the selective inverter 78 (the conductor 122 presenting the last bit to most recently enter the converter 70 from the line 114, conductor 124 the next-to-last bit to enter, etc.). It will thus be perceived that, whenever a reading operation is commenced, whatever is being read by the read head of the disk unit 64 from the track 30 is presented to the converter 70 via the line 114 in the form of a series of binary valued signal levels of periods correllated in time with the frequency of the clock 72 and representing successive bits of information (or, at a more physical level, states of magnetic polarization of the successive zones of the track being scanned by the read head), and the converter 70 is, in turn, presenting the five most recently read serial bits from the line 114 to the inverter 78 in continuously up-dated, 5-bit parallel form upon the conductive paths 122, 124, 126, 128 and 130.

Similarly, the inverter 78, which may be implemented in the same fashion as the inverter 57, is continuously passing each successively up-dated, 5-bit parallel group from the converter 70 to the decoder 80 via the parallel data path 132, either as received from the converter 70 or in "1's complemented" form as hereinafter further explained. Moreover, the decoder 80, which may be implemented in fashion similar to the encoder 56 (except that the ROM of the decoder 80 employs thirty-two cells of four bits each respectively addressable by the 5-bit signal groups received by the decoder 80 from the data path 132), translates each 5-bit group received upon the data path 132 into a corresponding 4-bit nybble of information in internal coded form in accordance with the mapping adopted (e.g., that of Table I) and presents the same to the latch 82 via the 4-bit data path 134. The 4-bit parallel data latch 82, which may also be implemented in conventional fashion, is in turn adapted, when triggered to do so by a group clocking pulse from the control counter 76, to transmit a 4-bit data group received from the decoder 80 to the buffer 52 via a 4-bit parallel data path 136.

It will be perceived, however, that, despite the advantage from the standpoint of simplifying implementation of thus permitting the entire data path from the converter 70 through the inverter 78 and the decoder 80 to the latch 82 to be maintained in a continually up-dated state with the data always conforming to the latest bit delivered to the converter 70 via the line 114, only every fifth such data group is "valid data" in the sense of corresponding to one of the 5-bit recording code groups earlier recorded upon and to be read from the track 30 (the four intervening groups presented to the latch 82 representing merely interim "up-datings" during reading, which are derived from parts of two adjacent recording code groups). It remains to consider the manner in which the read portion of the controller 90 provides for deferring the transfer of data from the latch 82 to the buffer 52 until the read head of the unit 64 commences to read the data field 42 of the track 30 and for assuring that the nybbles of data then so transferred accurately correspond to the actual 5-bit recording code groups stored along the track 30.

The two most recently read bits are continuously applied from the leads 122 and 124 as the inputs to the EXCLUSIVE OR gate 73. During each cycle of the read clock 72 for which such bits have different values (one of them a "0" value and the other a "1" value), the gate 73 will provide a "1" valued control signal to the detector 74 via the control path 244; during each such cycle for which such bits have the same value (either "0" or"1"), the gate 73 will provide a "0" valued control signal to the detector 74 via path 244. The detector 74 comprises primarily an internal pulse counter adapted, when enabled, for counting clock pulses from the read clock 72, but for resetting itself to zero count whenever the required count enabling signal is absent during any cycle of the clock 72. The mentioned output from the gate 73 fed to the detector 74 via control path 244 is utilized as the "count enable/reset" signal for the detector 74, with the internal counter of the latter counting the clock pulses being received from the read clock 72 via path 236 during any period that the "1" valued count enabling signal is maintained on the control path 244, but with such counting being recommenced from zero whenever the signal on path 244 goes to "0" value, during any cycle of the clock 72. The internal counter of the detector 74 should have a capacity for counting to a number equivalent to (or only slightly less than) the number of bits in each recording code group times the number of such groups employed to represent the synchronizing portion of the leader gap 40. Thus, for a leader field 40 containing 511 5-bit recording code groups, a count capacity approaching 2555 (or even 2558, if the first three "synchronizing bits" of the start of data marker code group are to be "counted") would be appropriate. In practice, however, it has been found desirable in utilizing the attainment of a predetermined count in the counter of the detector 74 to indicate the reading of a valid leader field 40 to select for the applicable count criterion a value somewhat less than would be generated by the entire field 40 (say, about 2540 in the example under considerations), in order to allow the regenerator type read clock 72 to become stabilized during a few initial synchronizing code groups of the field 40 before the counting function of the detector 74 becomes critical to the detection of a valid preamble or leader field 40 (although the operative count value selected must be sufficient to assure that a synchronizing portion of the leader field 40 longer than the longest trash gap 48 to be encountered will have been detected before acceptance). In any event, when the counter of the detector 74 reaches the predetermined count value selected for indicating that the reading of a valid field 40 has been detected, that event is stored in a simple logic circuit (such as a flip-flop) within the detector 74, and the latter commences to "look for" the occurrence of a "0" valued signal on the control path 244 from the XOR gate 73, which would indicate the reading of the two like bits comprising the last two bits of the start of data marker of the improved format. More specifically, once the detector 74 has noted the reading of the synchronizing portion of a valid leader field 40 by counting, the next occurrence of a "0" valued signal on the control path 244 will not only cause the internal counter of the detector 74 to reset itself to zero (in readiness for the next reading operation), but will also through simple internal logic gating feed a control signal indicating detection of reading of the start of data marker to the control counter 76 via the control path 240.

Upon receiving such start of data marker detected signal from the detector 74, the control counter 76 immediately commences counting the clock pulses thereafter received from the read clock 72 and, by means of conventional, internal pulse count dividing techniques, outputs a control pulse to the data latch 82 via control path 204-246 and to the 1-bit latch 79 via control path 204-248, as well as to the address register incrementing circuitry of the buffer 52, for every fifth clock pulse received from the read clock 72 vai path 238. Such control pulses produced by the control counter 76, of course, each coincide with the passage of new data-representing 5-bit recording code group corresponding to one of such groups actually recorded on the track 30 down the 5-bit portion of the data path from the converter 70 through the inverter 78 to the decoder 80 and to the passage of a 4-bit nybble of data in half-byte internally coded form from the decoder 80 to the data latch 82 or from the latter to the buffer 52.

The nature and function of the 1-bit latch 79 should be clear from the previous discussion of the similar latch 59 of the write portion of the controller 90. Briefly, however, the latch 79, each time it receives a control pulse via the control path 204-248, stores the last bit of the current 5-bit group tapped from the lead 122 and feeds the previously stored last bit of the previous 5-bit group as a complementing control signal to the inverter 78 via control path 250. Thus, the inverter 78 selectively complements certain of the 5-bit groups passing therethrough, in accordance with the same rules as were employed with the inverter 57 during writing, as previously described.

The mentioned control pulses from the counter 76 to the data latch 82 and to the buffer 52 serve to trigger the transfer from the latch 82 to the buffer 52 via the data path 136 of successive nybbles of data information being read by the disk unit 64 and to increment the address register of the buffer 52 for proper storage of such information in the latter, in readiness for subsequent transfer thereof in byte (or multi-byte) units to the computer 50 under control of the latter via the data path 100 (during which appropriate incrementing of the address register of the buffer 52 and sensing of the completion of transfer of data therefrom will typically be handled by the computer 50).

In order that the controller 90 may operate autonomously with respect to transfers of data to the buffer 52 during reading, the control counter 76 is preferably provided with conventional internal circuitry for sensing when a count has been achieved corresponding to the completion of transfer from the data latch 82 to the buffer 52 of that number of nybbles of information representing a complete data field 42 of the improved format (say, 21, 248) and to thereupon at least reset and deactivate itself and preferably also provide a control signal to the buffer 52 via the path 204-206 for resetting the address register of the buffer 52.

An operation to read data from a tape medium is carried out by the controller 90 in essentially the same manner as above described for a disk medium. Although quite unnecessary in systems employing only disk media, since track selection may be conventionally handled by the communication of the computer 50 with the internal control circuitry of the disk drive unit 64 via the control path 230, controllers 90 for handling tape medium may also be provided with conventional circuitry for recognizing the first byte or so of data read from a data field 42 of the improved format as representing an identification key from which the particular "format-full" involved may be recognized for control or other purposes. Similarly, additional means for recording and reading the last few bytes of the data field 42 as a representation of a "check sum" for error controlling purposes may be provided for in conventional manner in the controller 90, in systems where that is desired.

From the foregoing description of the currently preferred embodiment, it should be apparent to those skilled in the art that the invention provides a comparatively simple and straightforward improvement over past and current practices in the magnetic storage device interfacing field, and one which efficiently achieves the significant advantages made possible through implementation of the unique format for information representation on which the invention is basically predicated. It will also be appreciated, however, that various modifications, especially in connection with the known alternative ways in which individual modules of the apparatus may be internally constructed, are both possible and predictable without departing from the real essence and kernel of the invention. Accordingly, the invention should be understood as measured only by the scope of the claims which follow, including a fair range of equivalents of the subject matter therein recited.

I claim:

1. In a method for translating information representations expressed in accordance with a first, plural-bit encoding as selected permutations of the binary-valued levels of the individual signals in each group of a first succession of groups of electrical signals into information representations expressed in accordance with a second, differing, plural-bit encoding as correlated permutations of the binary-valued levels of the individual signals in each group of a second succession of groups of electrical signals:

for an initial group of said first succession of groups, producing a corresponding initial group of said second succession of groups, in accordance with a first predetermined mapping of said selected permutations to said correlated permutations;

sensing the binary-valued level of a particular individual signal of said initial group of said second succession of groups;

for a second group of said first succession of groups next following said initial group thereof, producing a corresponding second group of said second succession of groups, in accordance with said first predetermined mapping when the level of said particular individual signal of said initial group of said second succession of groups is sensed as being of one binary-valued level thereof, and in accordance with a second predetermined mapping comprising the "1s" complement of said first predetermined mapping when the level of said particular individual signal of said initial group of said second succession of groups is sensed as being of the other binary-valued level thereof;

sensing the binary-valued level of said particular individual signal of each group of said second succession of groups following said initial group thereof; and for each of a plurality of groups of said first succession of groups successively following said second group thereof, producing a corresponding, successively following group of said second succession of groups, in accordance with said first predetermined mapping when the level of said particular individual signal of the last preceding group of said second succession of groups is sensed as being of said one binary-valued level thereof, and in accordance with said second predetermined mapping when the level of said particular individual signal of the last preceding group of said second succession of groups is sensed as being of said other binary-valued level thereof.

2. The invention as set forth in claim 1, wherein:

said first succession of groups includes a number of additional groups successively following said plurality of groups thereof; and for each of said number of additional groups of said first succession of groups, there is produced a corresponding, successively following group of said second succession of groups, in accordance with said second predetermined mapping when the level of said particular individual signal of the last preceding group of said second succession of groups is sensed as being of said one binary-valued level thereof, and in accordance with said first predetermined mapping when the level of said particular individual signal of the last preceding group of said second succession of groups is sensed as being of said other binary-valued level thereof.

3. In apparatus for translating information representations expressed in accordance with a first, plural-bit encoding as selected permutations of the binary-valued levels of the individual signals in each group of a first succession of groups of electrical signals into information representations expressed in accordance with a second, differing, plural-bit encoding as correlated permutations of the binary-valued levels of the individual signals in each group of a second succession of groups of electrical signals:

a first plurality of electrically conductive paths to which said signals representing successive groups of said first succession of groups are adapted to be applied;

a second plurality of electrically conductive paths for receiving said signals representing successive groups of said second succession of groups;

selectively operable, signal level inverting means intercoupled between each of said first plurality of paths and corresponding ones of said second plurality of paths, said inverting means having control input means for receiving a binary-valued control signal, said inverting means transferring signals upon said first plurality of paths to said second plurality of paths without altering the binary-valued level thereof when a control signal of one binary-valued level is applied to said control input means, and applying to said second plurality of paths signals comprising the "1s" complement of signals upon said first plurality of paths when a control signal of the other binary-valued level is applied to said control input means; and means for applying to said control input means a control signal of binary-valued level corresponding to the binary-valued level of the signal upon a particular one of said second plurality of paths at a predetermined interval of time prior to said application of said control signal to said control input means.

4. A format for the storage of retrievable encoded data on an annular track presented on a rotatable disk storage medium, said format comprising:

a leader field for each set of data to be stored on said track, each leader field containing a plurality of encoded bits of control information extending along a portion of said track from a randomly selected starting point which may be offset from the starting points for other sets of data previously recorded on said track;

a data field corresponding to each leader filed and including at least one data sector containing a plurality of encoded bits of data stored on said track, each data field occupying a portion of said track following the corresponding leader field; and a trash gap extending along said track between the data field and the starting point for each set of data, each trash gap occupying a space on the track which may contain encoded bits of now spurious data remaining from a set of data previously recorded on the track and said leader field containing more encoded bits than can be recorded on the trash gap.

5. A data storage format from a rotatable disk storage medium having a rotational speed which may vary within tolerable limits and an annular track on which successive sets of retrievable encoded data may be stored, said storage formal comprising:
   a starting point on said track for each set of data having a random location relative to the starting points for other sets of data previously and subsequently recorded;
   a leader field for each set of data extending along the track from the starting point therefore and containing a plurality of encoded bits which provide a control set of information;
   a data filed for each set of data extending along the track from the end of the corresponding leader field and including at least one data sector containing a plurality of encoded bits of data; and
   a trash gap extending along the track between the data field and the starting point for each set of data, each trash gap being shorter than the corresponding leader field at all rotational speeds of the disc medium within said tolerable limits to prevent spurious data, which may be present on the trash gap as a remnant of a previously stored set of data, for simulating a valid set of control information.

6. A format for the storage of retrievable encoded data arranged in at least one logical record unit to be stored on a recording medium track on which successive sets of data may be prewritten, said format comprising:
   a leader field extending for a predetermined length along the track from a preselected starting point and containing a plurality of encoded bits of control information;
   a data field extending along the track from the end of the leader field and including at least one data sector containing a plurality of encoded bits of data; and
   a trash gap extending along said track from the end of the data field and terminating at a location defining the end of the logical record unit, said trash gap occupying a location on the track which may contain encoded bits of spurious data remaining from a set of data previously recorded on the track and said trash gap having a length less than the length of the leader field to prevent spurious data on the trash gap from simulating valid control information.

7. A method of storing retrievable encoded data on an annular track presented on a rotatable disk storage medium, said method comprising the steps of:
   randomly selecting a starting point on the track for each set of data which is to be stored on the track;
   establishing a leader field on the track which begins at the starting point for the set of data to be stored and ends downstream therefrom;
   magnetically recording a plurality of encoded bits of control information on said leader field to record thereon a complete set of control data;
   establishing a data filed on the track which begins at the end of the leader field and ends short of said starting point to present a trash gap on the track between the data field and starting point, said trash gap occupying a space on the track which may contain encoded bits of now spurious data remaining from a set of data previously recorded on the track;
   magneticlly recording encoded bits of data on said data field; and
   maintaining said trash gap shorter than said leader field under all permissible rotational speeds of the storage medium to prevent spurious data which may remain on the trash gap from simulating a valid set of control data.

8. A method of successively storing different sets of data on an annular track of a rotatable disk storage medium having rotational speeds which vary within tolerable limits, said method comprising the steps of:
   selecting a staring point on the track which may have a different location for each set of data to be stored on the track;
   establishing a leader field on the track which extends from the starting point from each set of data to be stored;
   recording on each leader field a preselected number of encoded bits of control information which occupies the entire leader field and which provides a complete set of control data;
   establishing a data field on the track which extends from the end of the leader field for each set of data to be stored;
   terminating the data field short of the starting point for each set of data to establish a trash gap between the data field and starting point at a location on the track wherein the trash gap may contain spurious data remaining from a set of data previously stored on the track;
   recording encoded bits of data on the data field; and
   maintaining each leader field longer than the corresponding trash gap to prevent spurious data n the trash gap from simulating a valid set of control data.

9. A method of storing retrievable encoded data arranged in at least one logical record unit to be stored on a recording medium track having speeds which may vary within tolerable limits, said method comprising the steps of:
   selecting a starting point on the track at which storage of the record unit is to commence;
   establishing a leader field on the track extending from the starting point;
   magneticlly recording on said leader field a plurality of encoded bits of control information which occupy the entirety of the leader field;
   establishing a data field on the track extending from the end of the leader field;
   terminating the data field at a preselected location defining the end of the record unit to establish a trash gap at the end of the data filed at a location on the track wherein the trash gap may contain spurious data remaining from previously stored data;
   magnetically recording encoded bits of data on the data field; and
   maintaining said leader field longer than said trash gap to prevent spurious data that may be present on the trash gap from simulating a valid set of control information.

10. A format for the storage of retrievable encoded data arranged in at least one logical record unit to be stored on a recording medium track on which successive sets of data may be prewritten, said format comprising:
   a leader field extending for a predetermined length along the track from a preselected starting point independent of any indexing and containing a plurality of encoded bits of control information;

a data field extending along the track from the end of the leader field and including at least one data sector containing a plurality of encoded bits of data; and a trash gap extending along said track from the end of the data field and terminating at a location defining the end of the logical record unit, said trash gap occupying a location on the track which may contain encoded bits of spurious data remaining from the set of data previously recorded on the track and said trash gap having a length less than the length of the leader field to prevent spurious data on the trash gap from simulating valid control information.

11. A method of storing retrievable encoded data arranged in at least one logical record unit to be stored on a recording medium track having speed which may vary within tolerable limits, said method comprising the steps of:

selecting a starting point on the track independent of any indexing at which storage of the record unit is to commence;

establishing a leader field on the track extending from the starting point;

magnetically recording on said leader field a plurality of encoded bits of control information which occupy the entirety of the leader field;

establishing a data field on the track extending from the end of the leader field;

terminating the data field at a preselected location defining the end of the record unit to establish a trash gap at the end of the data field at a location on the track wherein the trash gap may contain spurious data remaining from previously stored data;

magnetically recording encoded bits of data on the data field; and maintaining said leader field longer than said trash gap to prevent spurious data that may be present on the trash gap from simulating a valid set of control information.

* * * * *